United States Patent
Kao (10) Patent No.: US 6,175,737 B1
(45) Date of Patent: *Jan. 16, 2001

(54) METHOD AND APPARATUS FOR WIRELESS COMMUNICATIONS FOR BASE STATION CONTROLLERS

(75) Inventor: Chiiming Kao, Saratoga, CA (US)

(73) Assignee: David E. Lovejoy, Tiburon, CA (US)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/751,520

(22) Filed: Nov. 15, 1996

(51) Int. Cl.[7] .............................. H04Q 7/22; H04Q 7/30
(52) U.S. Cl. ........................ 455/447; 455/560; 455/562
(58) Field of Search .................................. 455/422, 447, 455/554, 560, 561, 562

(56) References Cited

U.S. PATENT DOCUMENTS

| | | | |
|---|---|---|---|
| 5,065,449 | * 11/1991 | Gordon et al. | 455/562 |
| 5,603,089 | * 2/1997 | Searle et al. | 455/562 |
| 5,771,453 | * 6/1998 | Haartsen | 455/561 |
| 5,787,355 | * 7/1998 | Bannister et al. | 455/458 |

* cited by examiner

Primary Examiner—Andrew M. Dolinar
(74) Attorney, Agent, or Firm—Law Office of Imam (57) ABSTRACT

A cellular communication system having a plurality of wireless in-band channels and having a plurality of cells with a plurality of mobile stations in each cell where a base station (BTS) is the interface between mobile stations and a base station controller (BSC). The base station controller monitors and controls one or more base stations. A wireless trunk is established between the base station and the base station controller using selected ones of the allocated channels otherwise available for mobile station communications.

26 Claims, 9 Drawing Sheets

METHOD AND APPARATUS FOR WIRELESS COMMUNICATIONS FOR BASE STATION CONTROLLERS

BACKGROUND OF THE INVENTION

The present invention relates to the field of two-way wireless communication systems and more specifically to methods and apparatus for wireless communications in mobile telephone systems.

Conventional Cellular Systems

Cellular mobile telephone systems have developed due to a large demand for mobile services. Cellular systems "reuse" frequency within a number of cells to provide wireless two-way radio frequency (RF) communication to large numbers of users (mobile stations). Each cell covers a small geographic area and collectively groups of adjacent cells cover a larger geographic region. Each cell has a fraction of the total amount of RF spectrum which is available to support cellular users located in the cell. Cells are of different sizes (macro-cell or micro-cell) and are generally limited to a fixed capacity. The shapes and sizes of cells are functions of the terrain, the man-made environment, the quality of communication and user capacity. Cells are connected to each other via land lines or microwave links and to the public-switched telephone network (PSTN) through telephone switches. The switches provide for the hand-off of users from cell to cell and thus from frequency to frequency as mobile users move between cells.

Base Station (BTS)

In conventional cellular systems, base stations, or base transceiver stations (BTS), are the interface between mobile stations and the rest of the communications system. A base station is usually located in the center of a cell. The transmitting power of a base station determines the cell size. A base station typically has between one and sixteen transceivers where each transceiver uses separate RF channels. Base stations have RF transmitters and RF receivers co-sited for transmitting and receiving communications to and from cellular users (mobile stations) in the cell. The base stations employ forward RF frequency bands (forward carriers) to transmit forward channel communications to users and employ reverse RF bands (reverse carriers) to receive reverse channel communications from users in the cell. Conventional forward channel communications are static in that they employ fixed power, at fixed frequencies and have fixed sectors if sectorized antennae are used.

The forward and reverse channel communications use separate frequency bands so that simultaneous transmissions in both directions are possible. This operation is referred to as frequency domain duplex (FDD) signaling. Although time domain duplex (TDD) signaling, in which the forward and reverse channels take turns using the same frequency band is possible, such operation is not part of any widespread current cellular implementation.

The base station in addition to providing RF connectivity to users also provides connectivity to a Mobile Telephone Switching Office (MTSO). In a typical cellular system, one or more MTSO's will be used over the coverage region. Each MTSO can service a number of base stations and associated cells in the cellular system and supports switching operations for routing calls between other systems (such as the PSTN) and the cellular system or for routing calls within the cellular system.

Base Station Controllers

In conventional cellular systems, base station controllers (BSC) monitor and control one or more base stations. The number of base stations controlled typically is between several tens and several hundreds. The principal tasks of the base station controllers are frequency administration, the control of a base station, and exchange functions. The base station controllers assign RF carriers to support calls, coordinate the handoff of mobile users between base stations, and monitor and report on the status of base stations. The base station controllers can be located at the same site as the base stations or at a different site. Base station controllers and base stations together form a functional unit referred to as the base station subsystem (BSS).

Mobile Services Switching Center

The mobile services switching center (MSC) is the interface between the cellular system and the PSTN. The MSC is a switching exchange (switch) for routing calls from the fixed PSTN network through the base station controllers (BSC) and the base stations (BTS) to individual mobile stations (MS). The MSC switch provides the network with data about individual mobile stations. Depending on the cellular network size, one or more interfaces to the fixed PSTN network may exist through one or more switches. The number of base stations controlled by a single MSC depends upon the traffic at each base station, the cost of interconnection between the MSC and the base stations, the topology of the service area and other similar factors.

Operation and Maintenance Center

The operation and maintenance center (OMC) has access to both the MSC switches and the base station controllers in order to process error messages coming from the network and to control the traffic load of the BSC controllers and the BTS base stations. The OMC configures the BTS base stations through the BSC and allows components of the system to be checked.

A handoff between base stations occurs, for example, when a mobile user travels from a first cell to an adjacent second cell. Handoffs also occur to relieve the load on a base station that has exhausted its traffic-carrying capacity or where poor quality communication is occurring. The handoff is a communication transfer for a particular user from the base station for the first cell to the base station for the second cell. During the handoff in conventional cellular systems, there is a transfer period of time during which the forward and reverse communications to the mobile user are severed with the base station for the first cell and are not established with the second cell. A typical conventional cellular system has the transfer period designed to be less than 100 milliseconds.

Conventional cellular implementations employ one of several techniques to reuse RF bandwidth from cell to cell over the cellular domain. The power received from a radio signal diminishes as the distance between transmitter and receiver increases. All of the conventional frequency reuse techniques rely upon power fading to implement reuse plans. In a frequency division multiple access (FDMA) system, a communications channel consists of an assigned particular frequency and bandwidth (carrier) for continuous transmission. If a carrier is in use in a given cell, it can only be reused in cells sufficiently separated from the given cell so that the reuse site signals do not significantly interfere on the carrier in the given cell. The determination of how far away reuse sites must be and of what constitutes significant interference are implementation-specific details. The cellular Advanced Mobile Phone System (AMPS) currently in use in the United States employs FDMA communications between base stations and mobile cellular telephones.

In time division multiple access (TDMA) systems, multiple channels are defined using the same carrier. The separate channels each transmit discontinuously in bursts which are timed so as not to interfere with the other channels on that carrier. Typically, TDMA implementations also employ FDMA techniques. Carriers are reused from cell to cell in an FDMA scheme, and on each carrier, several channels are defined using TDMA methods.

In code division multiple access (CDMA) systems, multiple channels are defined using the same carrier and with simultaneous broadcasting. The transmissions employ coding schemes such that to a given channel on a given carrier, the power from all other channels on that carrier appears to be noise evenly distributed across the entire carrier bandwidth. One carrier may support many channels and carriers may be reused in every cell.

In space division multiple access (SDMA) systems, one carrier is reused several times over a cellular domain by use of adaptive or spot beam-forming antennae for either terrestrial or space-based transmitters.

TDMA Conventional Cellular Architectures

In TDMA systems, time is divided into time slots of a specified duration. Time slots are grouped into flames, and the homologous time slots in each frame are assigned to the same channel. It is common practice to refer to the set of homologous time slots over all frames as a time slot. Each logical channel is assigned a time slot or slots on a common carrier band. The radio transmissions carrying the communications over each logical channel are thus discontinuous. The radio transmitter is off during the time slots not allocated to it.

Each separate radio transmission, which should occupy a single time slot, is called a burst. Each TDMA implementation defines one or more burst structures. Typically, there are at least two burst structures, namely, a first one for the initial access and synchronization of a user to the system, and a second one for routine communications once a user has been synchronized. Strict timing must be maintained in TDMA systems to prevent the bursts comprising one logical channel from interfering with the bursts comprising other logical channels in the adjacent time slots. When bursts do not interfere, they are said to be isolated.

The isolation of one burst from the preceding and following bursts is crucial for TDMA systems. The defined burst structures are constructed to assist in the isolation process. A burst theoretically cannot completely fill its allotted time slot because radio transmitters neither commence nor cease transmitting instantaneously. TDMA implementations therefore allow time for radio signal strength to ramp up and to ramp down in each of the defined burst structures. During normal communications to and from a synchronized user, each burst does not quite fill its specified time slot. A guard period, $T_G$, is inserted before or after each normal burst to allow for timing mismatches, multipath delays, and inaccuracies within the system. The initial synchronization bursts for accessing the system fill even less of a time slot than do normal bursts. The long guard period, $T_G$, for synchronization bursts is used to overcome the timing mismatches caused by the unknown separation between a user and the base station.

Within a cell, the base station maintains a time base which users synchronize to during initial access. User synchronization to a particular base station is achieved using synchronization bursts sent periodically on a specific carrier by that base station and the reply synchronization bursts sent by the user. Those reply transmissions will arrive delayed at the given base station by the propagation time for radio signals over the separation between the user and the given base station. The separation is generally unknown because the users are mobile. Not only is a burst delayed, but in the cellular multi environment, multiple copies of the burst are received over some delay spread corresponding to multipath reception over reflected paths of varying lengths. A digital signal processing technique known as equalization is commonly used in RF communications to correct for multipath delay spreading and fading. After equalization, the base station can measure a single skewing delay time for the user synchronization burst. The base station then commands the user to correct for this delay time by time advancing the user bursts by an equal time interval. Thus each individual user has a time base set by the base station to ensure that the transmissions from al users will arrive back at the base station in synchronization with the base station time base.

These burst structures are detailed for two typical conventional cellular TDMA implementations. Under the European-defined "Global system for mobile communications" (GSM) standard, which is substantially copied in the United States within the PCS 1900 standard, each RF carrier occupies 200 kHz of bandwidth. Each carrier is divided into time slots of 577 $\mu$s, organized into 8-slot frames lasting 4.615 ms. Each physical channel receives one time slot per frame, and a variety of logical channels may be constructed on a physical channel. The digital coding scheme used in GSM has a bit length of 3.69 $\mu$s. A normal speech burst consists of 148 bits of information followed by 8.25 bits of guard time. Thus for GSM, the standard is $T_G$=8.25 bits= 30.44 $\mu$s. The reverse channel synchronization (in GSM terminology, the random access) burst has 88 bits of signaling information followed by 68.25 bits of guard time. Thus for GSM, the $T_{LG}$=68.25 bits=252 $\mu$s.

Under the IS136 TDMA standard, each RF carrier occupies 30 kHz of bandwidth. Each carrier is divided into time slots of 6.67 ms, organized into 6-slot frames lasting 40 ms. Each logical channel receives two time slots per frame. The bit length for IS136 is 20.58 $\mu$s. A normal reverse channel burst consists of 6 guard bits, 6 ramp bits, and 312 bits of mixed control signaling and data. Thus for IS136, $T_G$=6 bits=123.48 is. The reverse channel synchronization burst has a longer guard period of 38 bits, so that $T_{LG}$=38 bits=782.0 us for IS136.

In accordance with the above background, there is a need for improved wireless communication systems which overcome the limitations of conventional cellular systems.

SUMMARY OF THE INVENTION

The present invention is a cellular communication system having a plurality of wireless in-band channels and having a plurality of cells with a plurality of mobile stations in each cell where a base station (BTS) is the interface between mobile stations and a base station controller (BSC). The base station controller monitors and controls one or more base stations. In the present invention, a wireless trunk is established between the base station and the base station controller using selected ones of the allocated channels otherwise available for mobile station communications.

The base station is formed with a base unit including a first transceiver operating with a first wireless interface formed of first ones of the in-band channels for broadcasting the forward channel communications and for receiving the reverse channel communications. Also, the base station is formed with a trunk unit including a second transceiver operating with a second wireless interface formed of second ones of the in-band channels for transmitting the forward channel communications and for receiving the reverse channel communications. The base unit connects the channel communications to and from the trunk unit and the trunk unit connects the channel communications to and from the base unit.

The mobile stations include a mobile station transceiver for receiving the forward channel communications and for broadcasting the reverse channel communications over the first wireless interface.

The base station controller operates to transmit the forward channel communications and receive the reverse channel communications over the second wireless interface.

In the present invention, channels are assigned to the first or second wireless interfaces in a manner that avoids interference between the channels. Accordingly, the present invention permits in-band wireless connections between base stations and base station controllers without the need of wired connections or the need for out-of-band frequency channels.

The foregoing and other objects, feats and advantages of the invention will be apparent from the following detailed description in conjunction with the drawings.

DETAILED DESCRIPTION

Figure 1:
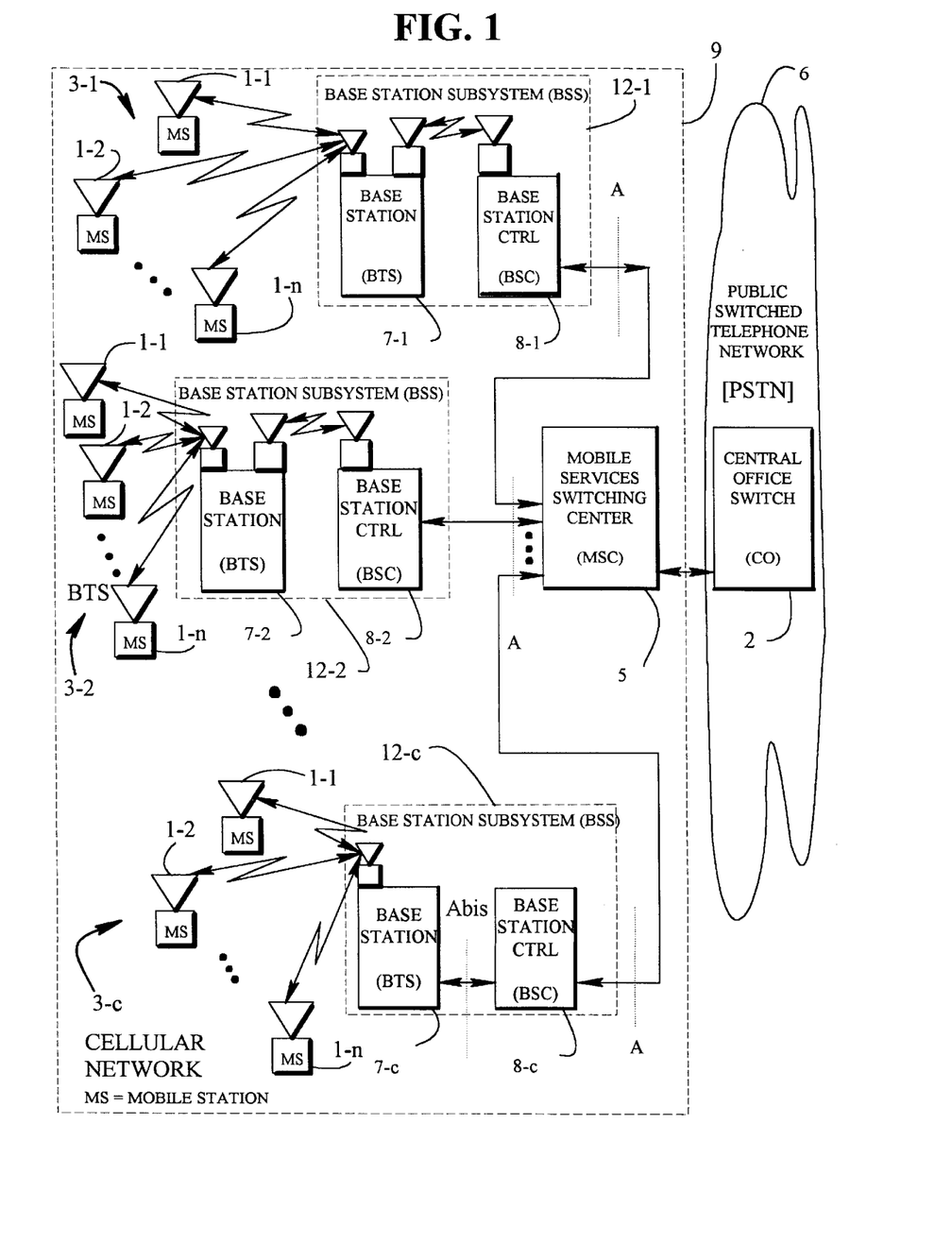
FIG. 1 depicts a block diagram of a cellular communications system connected to the public switched telephone network.

In FIG. 1, a cellular communications system 9 is connected to a central office switch (CO) 2 of the public switched telephone network 6 through a mobile switching center (MSC) 5. The cellular communications system 9 includes a plurality of cells 3-1, 3-2, . . . , 3-c where each of the cells 3 connects through the mobile switching center (MSC) 5 to the PSTN 6.

In FIG. 1, each of the cells 3 includes a plurality of cellular users (mobile stations) 1, including mobile stations 1-1. 1-2, . . . , 1-n. Each of the cells 3 includes a base station subsystem (BSS) 12. Particularly, cells 3-1, 3-2, . . . , 3-c include base station subsystems 12-1, 12-2, . . . , 12-c, respectively. Each base station subsystem 12 has a first wireless interface, $W_{ms}$, to the mobile stations 1 in the cell and a wireline interface, A, to a mobile switching center (MSC) 5.

The base station subsystems 12 each include a base station (BTS) 7 and a base station controller (BSC) 8. Particularly, the base station subsystems 12-1, 12-2, . . . , 12-c include the base stations 7-1, 7-2, . . . , 7-c and the base station controllers 8-1, 8-2, . . . , 8-c. The base stations 7 and the base station controllers 8 are connected by either a conventional wireline $A_{bis}$ interface or, in accord with the present invention, a wireless trunk interface, $W_t$, that supports a wireline $A_{bis}$ interface. Particularly, the base station subsystems 12-1 and 12-2 include a wireless interface that supports a wireline $A_{bis}$ interface while the base station subsystem 12-c is of conventional design and only includes a wireline $A_{bis}$ interface. Accordingly, the base stations 7-1 and 7-2 connect to the base station controllers 8-1 and 8-2, respectively, by a wireless trunk having wireless interfaces, $W_t$, and hence do not require wireline connections between base stations 7-1 and 7-2 and the base station controllers 8-1 and 8-2. The absence of the need for wireline connections between the base stations (BTS) and the base station controllers (BSC) provides great flexibility for the installation and location of base stations and base station controllers.

Figure 2:
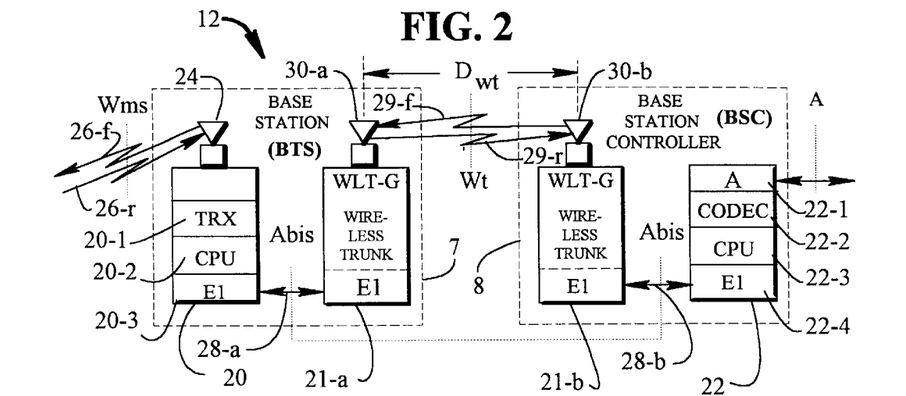
FIG. 2 depicts a block diagram of a base station subsystem used in the cellular communications system of FIG. 1.

Wireless Base Station Subsystem—FIG. 2

In FIG. 2, the base station subsystem 12 includes a base station (BTS) 7 and a base station controller (BSC) 8 connected by a wireless interface $W_t$. The base station 7 includes a conventional base unit 20 which includes a transmitter/receiver unit (TRX) 20-1, a CPU processor 20-2 and an E1 interface unit 20-3. The external connections from and to the base unit 20 include a conventional wireless interface, $W_{ms}$, from the transmitter/receiver unit 20-1 (for communication with mobile stations through antenna 24) and a conventional wireline $A_{bis}$ interface from and to the E1 unit 20-3 (for communication directly or indirectly with a base station controller). The $A_{bis}$ interface from and to the E1 unit 20-3 in a normal wireline base station subsystem would connect directly to a conventional base station controller, like controller base unit 22 in FIG. 2. Controller 22 includes an E1 interface unit 224 that has a conventional wireline $A_{bis}$ interface (for communication with a base station), a CPU processor 22-3, a coder/decoder (CODEC) 22-2, and an A interface unit 22-1 providing a wireline A interface (for communication with the MSC 5 of FIG. 1).

In FIG. 2, the wireless interface, $W_t$, is controlled by the wireless trunk units 21-a and 21-b for base station 7 and base station controller 8, respectively. The wireless trunk unit 21a has a conventional wireline $A_{bis}$ interface from and to the E1 interface unit 20-3 of the base unit 20. The wireless trunk unit 21b has a conventional wireline $A_{bis}$ interface from and to the El interface unit 224 of the controller base unit 22. Each of the wireless trunk units 21-a and 21-b connect to each other through the wireless interface Wt and transmissions between antennae 30-a and 30-b. In operation, the wireless trunk units 21-a and 21-b logically connect the wireline $A_{bis}$ interface of the E1 interface unit 20-3 of the base unit 20 to the wireline $A_{bis}$ interface of the E1 interface unit 22-4 of the controller base unit 22.

The wireless trunk (WLT) units 21-*a* and 21-*b* use a proprietary communication interface $W_t$ to provide a wireless physical layer interface between the BTS base station 7 and the BSC base station controller 8 of a GSM cellular system. Typically, the wireless trunk interface supports a duplex data service with a basic data transfer rate of 2×64 Kbps in each direction, and can be upgraded to duplex *32×64* Kbps data service. With flexible modular design, the wireless trunk units 21-*a* and 21-*b* replace conventional wired E1/DSO interfaces.

Figure 3:
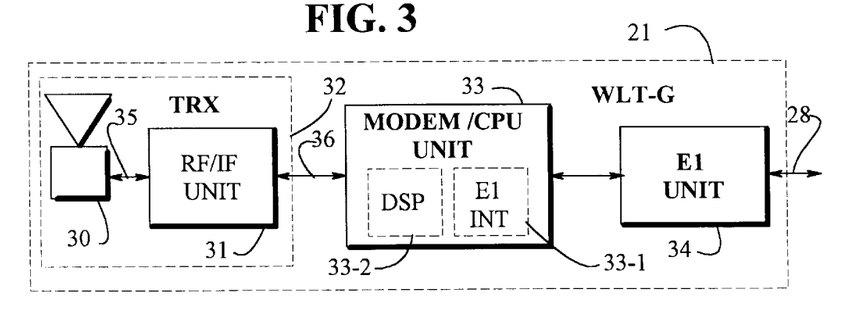
FIG. 3 depicts a block diagram of a wireless trunk unit used in the base station subsystem of FIG. 2.

Wireless Trunk Unit—FIG. 3

In FIG. 3, the wireless trunk unit 21 is typical of the wireless trunk units 21-*a* and 21-*b* of FIG. 2. The wireless trunk unit 21 includes a transmitter/receiver (transceiver) 30, an RF/IF unit 31, a modem/CPU processor unit 33 and an E1 interface unit 34. The transceiver 30 and RF/IF unit 31 in one preferred embodiment operate at a compatible in-band frequency of the current standard cellular systems (GSM: 900 MHz, DCS1800: 1800 MHz, PCS1900: 1900 MHz) to achieve a BER (Bit Error Rate) of less than $10^{-7}$ with the wireless trunk distance, $D_{wt}$, between wireless trunk units typically ranging from 50 m to 10 Km. The wireless trunk unit 21 is flexibly designed with three modules that are a transceiver (TRX) unit 32, a modem/CPU processor unit 33, and an E1 interface unit 34. The E1 interface unit 34 is a conventional circuit card or other device for providing physical layer links to interface with base stations (BTES) ani base station controllers (BCS). The modem/CPU processor unit 32 includes an E1 card or other device 33-1 to provide a physical layer interface to the E1 interface unit 34 and a DSP unit 33-2 for baseband processing functions. The TRX unit 32 includes an antenna 30 for transmitting and receiving electromagnetic signals and an RF/IF unit 31 that is shown in further detail in FIG. 4.

Figure 4:
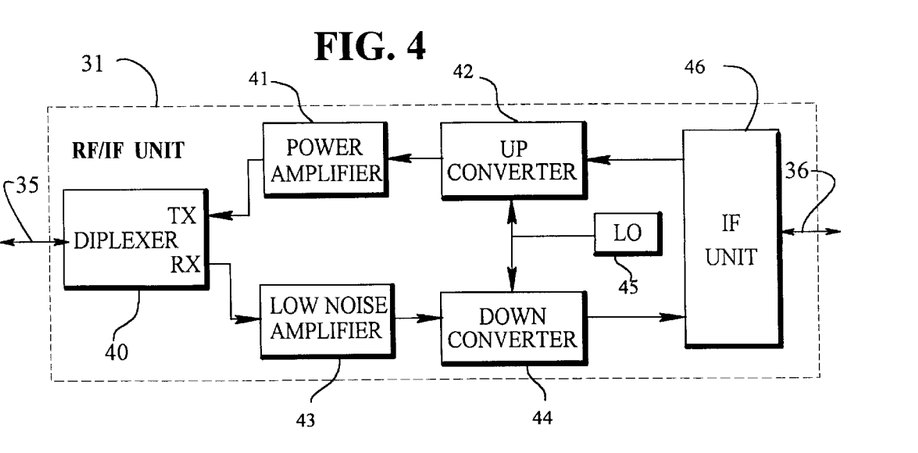
FIG. 4 depicts a block diagram of a RF/IF unit used in the wireless trunk unit of FIG. 3.

RF/IF Unit—FIG. 4

In FIG. 4, the RF/IF unit 31 includes a diplexer 40 for separating the transmit and receive RF signals. The receive channel includes a received RF signal low-noise amplifier 43, a down-converter 44 (connected to local oscillator 45) for shifting the received RF signal down to an IF frequency and an IF unit 46. The transmit channel includes an upconverter 42 (connected to local oscillator 45) for shifting the IF frequency signal to RF and a transmit RF power amplifier 41 for amplifying the RF signal to be broadcast. Further details of the wireless trunk design specification parameters are given in TABLE 1 as follows:

TABLE 1

WIRELESS TRUNK PARAMETERS

1. Operation Frequency: 900 MHZ, 1800 MHz, 1900 MHz.
2. Receiver Performance Requirement: BER < $10^{-7}$.
   $Eb/N_O$: >6 dBHz.
   Encoder method: Convolutional Code with constraint length K = 7, rate r = ½.
   Decoder method: Viterbi decoder.
3. Operation Range: 50 m to 10 km.
   Path Loss (without considering the multipath loss):
     L(dB) = 20Log[d(Km)] + 20Log[F(MHz)] + 32.4
     d = operation distance in Km
     F = operation frequency in MHZ
   Path loss (dB):
     900 MHZ: −65 to −112 dB
     1800 MHZ: −71 to −118 dB
     1900 MHZ: −71.5 to −118.5 dB
   With the multiple path fading effect included,
   a 5 to 10 dB loss should be added to the total path loss, i.e.
     900 MHZ: −75 to −122 dB
     1800 MHZ: −81 to −128 dB
     1900 MHZ: −81.5 to −128.5 dB
4. Antenna Type: Parabolic Dish Antenna: Diameter = D, efficiency k = 55%.
   Antenna Gain (G):

$$G = k\left[\frac{\prod D}{\lambda}\right]^2$$

Gain for D = 1.0 m: 16.9 dB at 900 MHz, 22.9 dB at 1800 MHz, 23.4 dB at 1900 MHz.
   3 dB Beamwidth (BW):

$$BW = \frac{70\lambda}{D}$$

BW: 23.3° at 900 MHz, 11.6° at 1800 MHz, 11.1° at 1900 MHz.
5. Transmit Power:
     EIRP = TX power × AntennaGain
   For TX_Power = 100 mW = −10 dBW
     EIRP(dBW) = 6.9 at 900 MHZ, 12.9 at 1800 MHZ, 13.4 at 1900 MHZ.
   For TX_Power = 50 mW = −13 dBW
     1.0 m Antenna: EIRP(dBW) = 3.9 at 900 MHZ, 9.9 at 1800 MHZ, 10.4 at 1900 MHZ.
6. Receive Power:
     RXPower = TX EIRP − Path Loss + RX Antenna Gain TABLE 1-continued

WIRELESS TRUNK PARAMETERS

Received power with three different transmitted power, 100 mW, 50 mW, and 25 mW are listed as follows (1 dBW = 30 dBm):

| Tx_power | 900 MHZ (dBm) | 1800 MHZ (dBm) | 1900 MHZ (dBm) |
|---|---|---|---|
| 100 mW | −11.2 to −58.2 | −5.2 to −52.2 | −4.7 to −51.7 |
| 50 mW | −14.2 to −61.2 | −8.2 to −55.2 | −16.7 to −63.7 |
| 25 mW | −17.2 to −64.2 | −11.2 to −58.2 | −19.7 to −66.7 |

7. Modulation Method:
   0.3 GMSK: 160 KHz (approximate bandwidth requirement).
8. Transmission Rate and Channel Bandwidth:
   Data Rate: 128 Kbps.
   Channel Rate: 256 Kbps.
   Bandwidth: compatible with the GSM specification (200 KHz).

Figure 5:
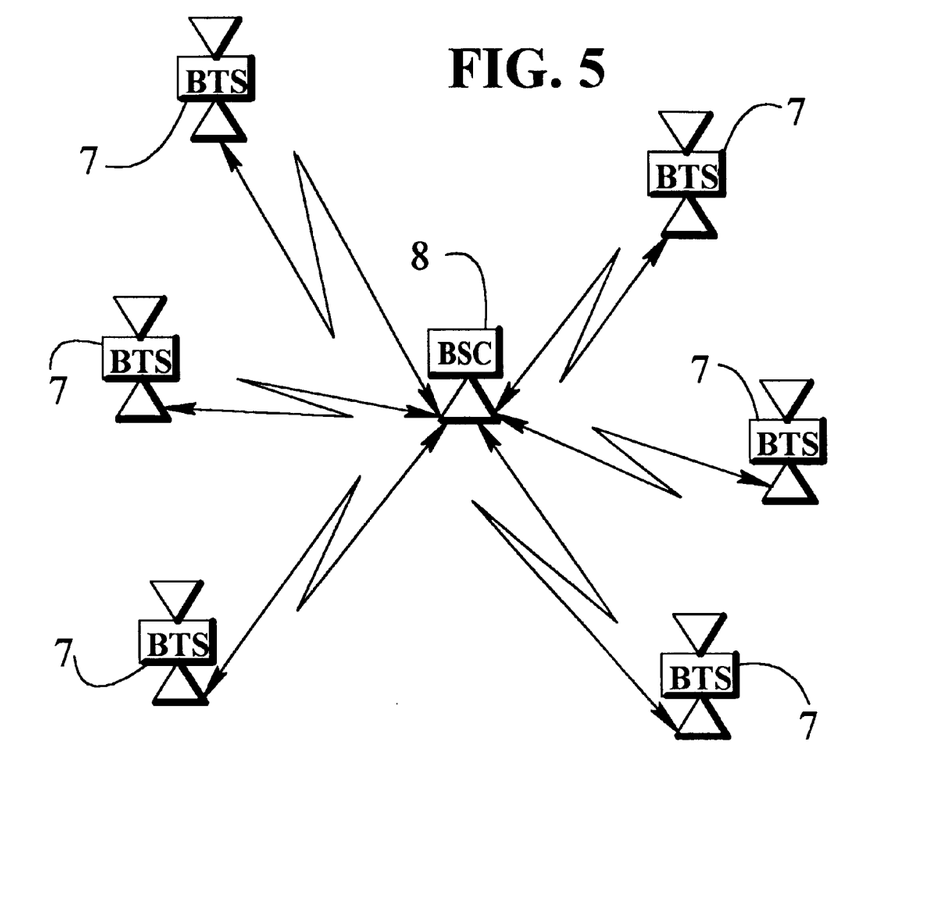
FIG. 5 depicts a block diagram of a star configuration of base stations in accordance with the present invention.

BTS Array Around BCS—FIG. 5

In FIG. 5, an array of base stations (BTS) 7 with wireless interfaces to a central base station controller (BSC) 8 as shown. Each of the base stations 7 is located at a different angular position from the base station controller to help in isolating the trunk wireless interfaces between the base stations and the base station controller.

Figure 6:
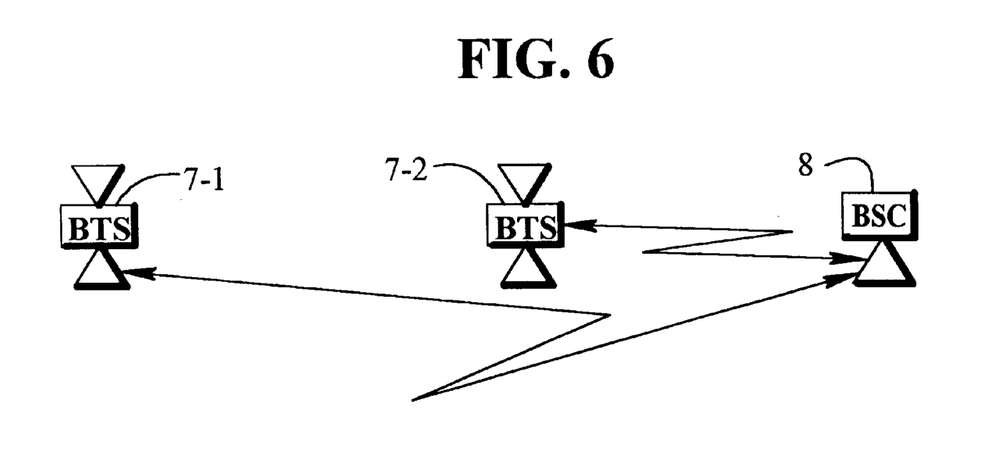
FIG. 6 depicts a block diagram of a hop configuration of base stations in accordance with the present invention.

In-line Base Station Controller Configuration—FIG. 6

In FIG. 6, the base stations (BTS) 7-1 and 7-2 are colinear with the base station controller 8. Since the radiation path in FIG. 6 is colinear, greater frequency isolation between the wireless interfaces between the base stations 7-1 and 7-2 are required in order to avoid interference at the base station controller 8.

Figure 7:
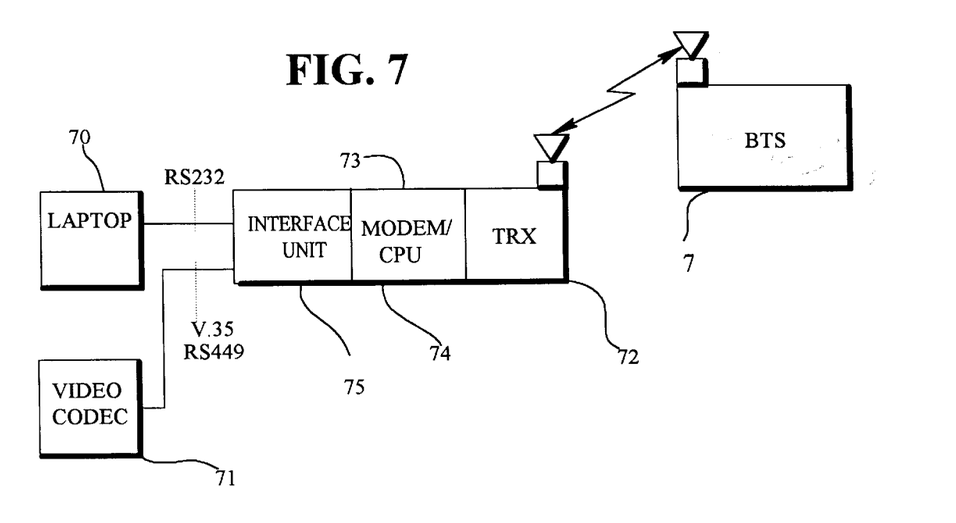
FIG. 7 depicts a block diagram of a data interface for base stations in accordance with the present invention.

Wireless Data System—FIG. 7

In FIG. 7, a wireless trunk unit 73 is used to connect data devices, such as a laptop computer 70 or other portable computer or such as a video coder/decoder (codec) 71 to a base station (BTS) 7. The wireless trunk unit 73 includes an interface unit 75 that connects through interfaces (such as standard interfaces RS232, V.35 and RS449) to data devices (such as computer 70 or video codec 71).

In order to achieve a low bit error rate (BER) for low signal-to-noise ratio (SNR) signals, a bank of digital tracking filters is implemented for a QPSK threshold extension demodulator. This design is implemented in field programmable gate arrays (FPGA) or application specific integrated circuits (ASIC) to reduce the size and cost of the high speed digital modem.

GSM Signals—FIGS. 8a–8d

Figure 8A:
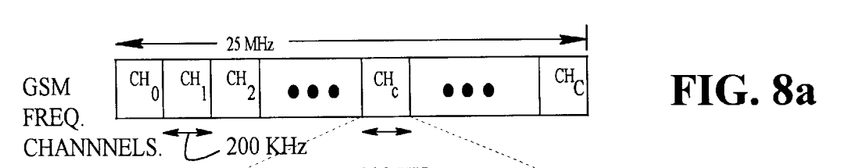
FIGS. 8a through 8d depict representations of signals in a GSM cellular system.
Figure 8B:
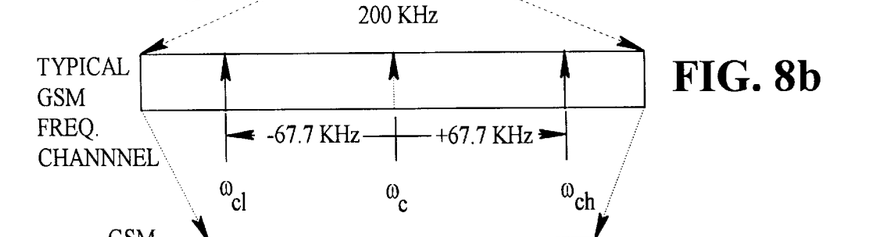

In FIG. 8a, the carrier frequencies $\omega_1(t), \omega_2(t), \ldots, \omega_J(t)$ are the center frequencies for the channels $CH_0, CH_1, \ldots, CH_c, \ldots, CH_C$. In a GSM embodiment, the channels are each 200 KHz in bandwidth as shown for typical channel $CH_c$ in FIG. 8b. In FIG. 8b, the channel $CH_c$, typical of each of the channels, has a low frequency $\omega_{cl}$ and a high frequency $\omega_{ch}$. Typically, $\omega_{cl}$ is 67.7 KHz below the center frequency $\omega_c$ and $\omega_{ch}$ is 67.7 KHz above the center frequency $\omega_c$. For a GSM system, the information signal is in digital form and has logical 1's and logical 0's. The logical 1's and logical 0's of the information signal frequency shift key (FSK) modulate the carrier frequency of FIG. 8b such that data values of logical 1 cause the carrier $\omega_{ch}$ to be on and the carrier $\omega_{cl}$ to be off. Similarly, for data values of logical 0, the modulation causes the carrier $\omega_{cl}$ to be on and the carrier $\omega_{ch}$ to be off. Such modulation causes the distribution of the baseband data signal of the modulated signal $m_j(t)$ for the channel with center frequency carrier $\omega_c$ to be within the 200 KHz.

Figure 8C:
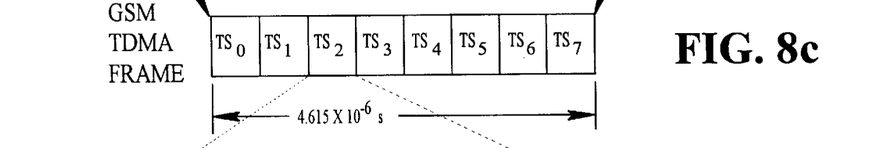
Figure 8D:
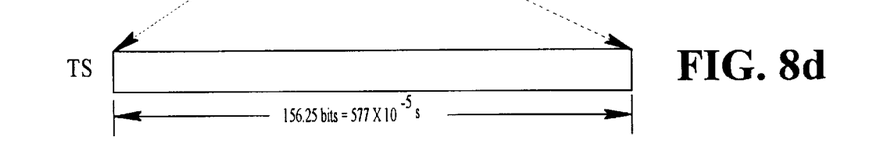

In GSM systems, each of the frequency channels like FIG. 8b is typically further divided into eight additional subchannels by time division multiplexing as shown in FIG. 8c. In FIG. 8c, the eight time slots $TS_0, TS_1, \ldots, TS_7$ are shown for a typical one of the channels $CH_c$ of FIG. 8b. Each of the time slots of FIG. 8c in a GSM system is defined to include 156.25 bits spread over a duration of $577 \times 10^{-6}$ seconds. These bits in each time slot are selected as a logical 1 or a logical 0 for transmitting information including data and control information.

Figure 9:
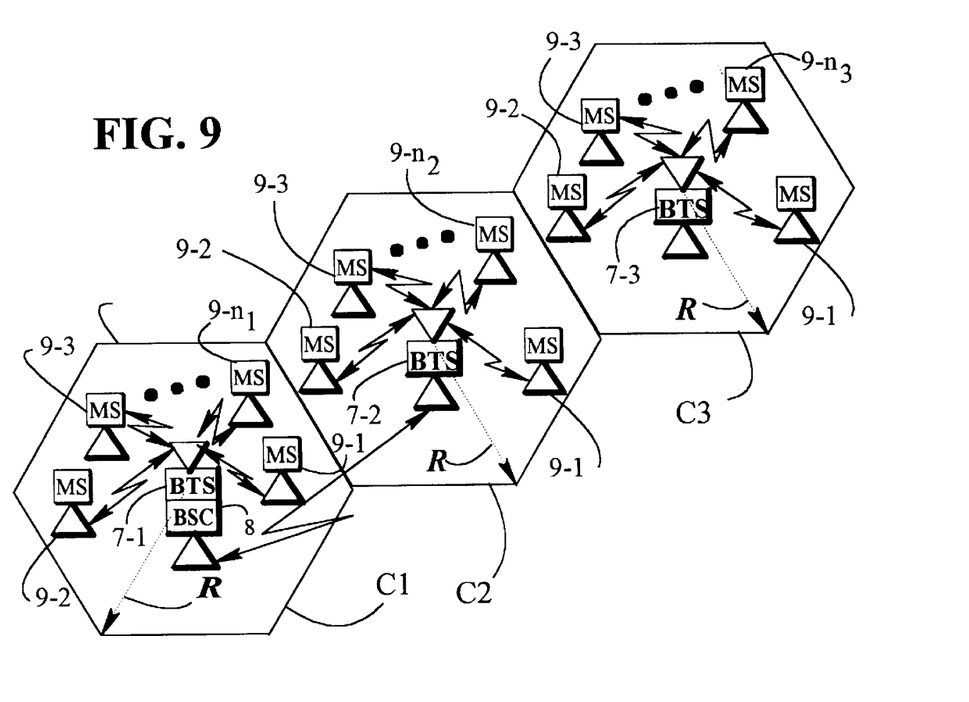
FIG. 9 depicts a representation of three adjacent cells in a cellular system.

Typical GSM Cells—FIG. 9

In FIG. 9, three GSM cells C1, C2 and C3 are shown with the base station (BTS) 7-1 having a first wireless interface to the mobile stations (MS) 9-1, 9-2, 9-3, ..., $9-n_1$ for cell $C_1$, with the base station 7-2 having a first wireless interface to the mobile stations 9-1, 9-2, 9-3, ..., $9-n_2$ for cell C2 and with the base station 7-3 having a first wireless interface to the mobile stations 9-1, 9-2, 9-3, ..., $9-n_3$ for the cell C3. Each cell nominally has a radius R within which are located the mobile stations 9 of the cell. The cells C1 and C3 may be adjacent or separated by one or more cells, such as cell C2 in FIG. 9.

The propagation path-loss of radio signals between a base station 7 and mobile stations 9 is inversely proportional to $R^\alpha$, where $\alpha$ lies between 2 (for free space propagation) and 5 (for propagation with multi-path fading). Due to the need and trend for small cell sizes (moving from macrocells typically having radii R of 1–25 km toward microcells typically having radii R of less than 500 m), the carrier frequencies per cell, in many instances, are reduced to one or two. This reduction in the number of carriers per cell for mobile station communications leaves unused carriers available for wireless trunk in-band communications. The wireless trunk in-band communications are achieved with acceptably low levels of interference with the mobile station communications through proper planning and selection of the carriers that are used for the first wireless interface, $W_{ms}$, between mobile station and base station and that are used for the second wireless interface, $W_t$, between base stations and base station controllers. Although actual performance is highly dependent on environmental factors, such as the geographic contour, the cell shape and the cell size, interference problems can be controlled by properly choosing the among other things antenna gain and type, the antenna height, and the transmitted power for each transmitting unit.

In the FIG. 9 example, it is assumed for purposes of explanation that all of the transmitters transmit with the same power. The frequency reuse distance D that must separate cells using the same frequency is calculated by $D=(3K)^{1/2}R$, where R is the cell radius and K is the number of different carrier frequency cells. For K=4, D=3.46 R and hence 3.46 R is the minimum separation of cell C1 and C3 in FIG. 9.

In FIG. 9, the base station controller (BSC) 8 connects to the base stations 7-2 and 7-3 with trunk wireless interfaces, $W_t$, that do not interfere with the mobile station wireless interfaces, $W_{ms}$, for the mobile stations 9 and the base stations 7-1, 7-2 and 7-3. The trunk wireless interfaces between the base stations and the base station controller use carrier frequencies that are either outside the assigned band for cells or that are within the assigned band but are not in use in the particular local region. For example, if cell C1 uses the frequencies $\omega_1(t)$ and $\omega_2(t)$, cell C2 uses the frequencies $\omega_3(t)$ and $\omega_4(t)$, and cell C3 uses the frequencies $\omega_5(t)$ and $\omega_6(t)$ as the in-band channels for the mobile station (first) wireless interface, then the C2 trunk (second) wireless interface between base station controller 8 and the base station 7-2 uses, for example, the frequencies $\omega_7(t)$ and $\omega_8(t)$ and the cell C3 trunk (second) wireless interface between base station controller 8 and the base station 7-2 uses the frequencies $\omega_9(t)$ and $\omega_{10}(t)$. While FIG. 9 depicts the cells C1 and C3 separated by intervening cell, C2, the normal relationship in cellular systems for complete area coverage is to have a number of contiguous and repeating cell patterns as shown in FIG. 10, for example.

Figure 10:
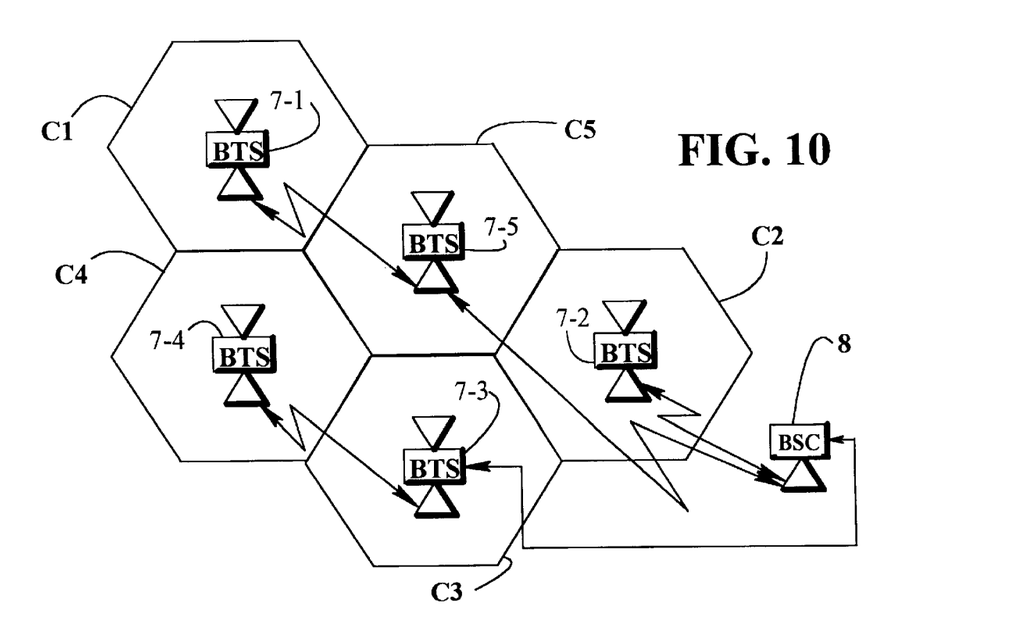
FIG. 10 depicts a representation of five adjacent cells in a cellular system.

Cell Arrays—FIG. 10

In FIG. 10, adjacent GSM cells C1, C2, C3, C4 and C5 are shown with the base stations (BIS) 7-1, 7-2, 7-3, 7-4 and 7-5 having first wireless interfaces to the mobile stations like those shown in FIG. 9). Each cell in FIG. 10 nominally has a radius R within which are located the mobile stations (not shown) of the cell. In addition, each of the base stations 7 connects directly or indirectly to the base station controller 8 (BSC) using either a wireline or a second wireless interface. Particularly, base station 7-2 has a second wireless interface to the base station controller 8, base station 7-3 has a wireline interface to the base station controller 8, base station 7-5 has a second wireless interface to the base station controller 8, base station 74 has a partial second wireless interface to the base station controller 8 through the base station 7-3, and base station 7-1 has a partial second wireless interface to the base station controller 8 through the base station 7-5.

In FIG. 10, the trunk wireless interfaces must be chosen so as to be non-interfering with each other and so as to be non-interfering with the mobile station wireless interfaces in the cells that are in close proximity. The manner in which frequencies are selected is explained with reference to specific examples.

Cell Repeat Patterns—FIGS. 11—16

Figures 11, 12:
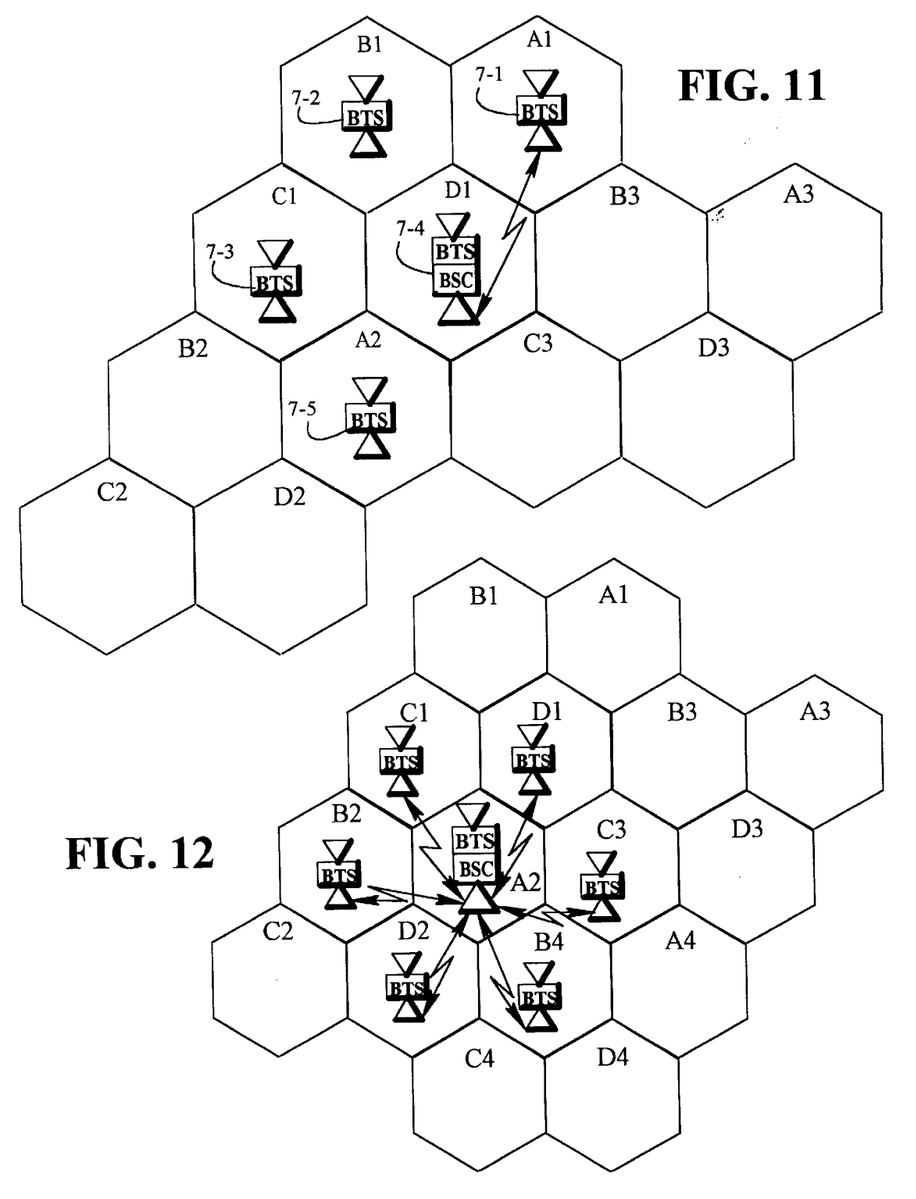
FIG. 11 depicts a representation of twelve cells in a cellar system that have a frequency reuse pattern of 4.
FIG. 12 depicts a representation of sixteen cells in a cellular system that have a frequency reuse pattern of 4 using six wireless trunks.
Figure 13:
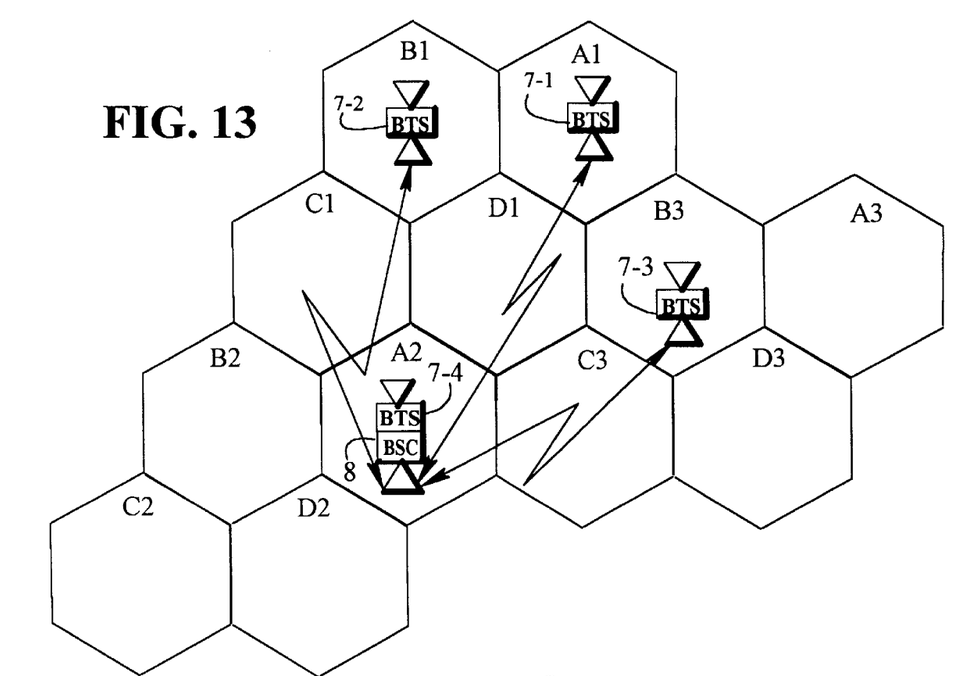
FIG. 13 depicts a representation of twelve cells in a cellular system that have a frequency reuse pattern of 4 using three wireless trunks.
Figure 14:
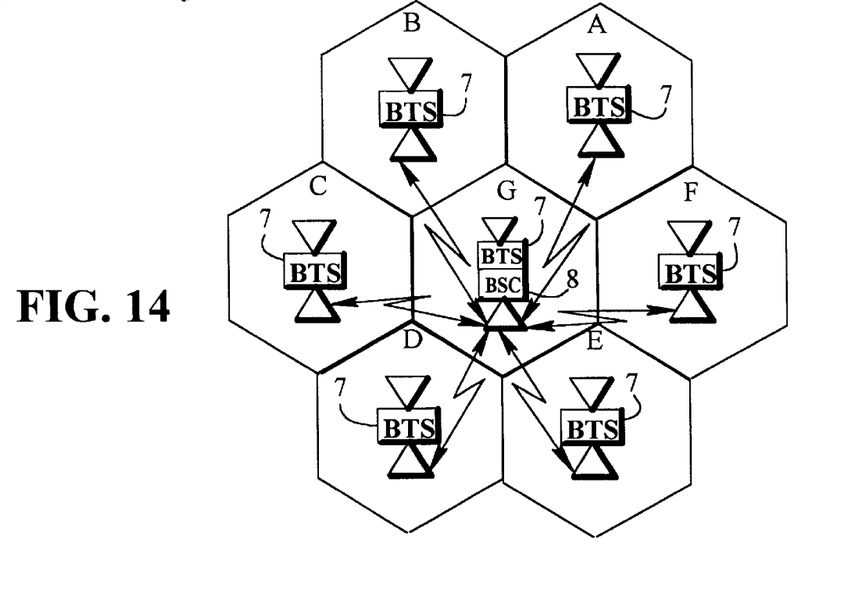
FIG. 14 depicts a representation of a seven cell cluster in a cellular system that uses seven wireless trunks.
Figure 15:
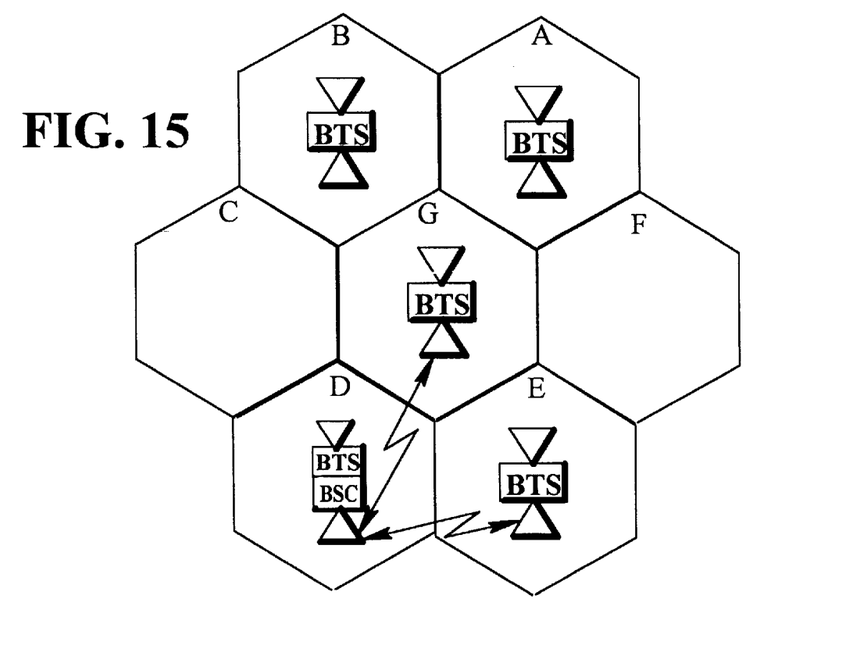
FIG. 15 depicts a representation of a seven cell cluster in a cellular system that uses two wireless trunks.
Figure 16:
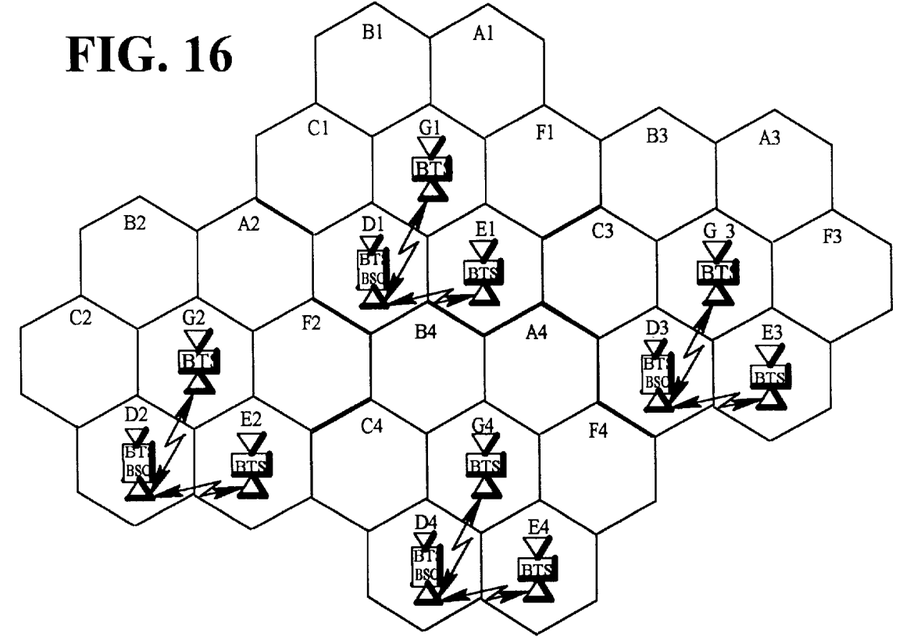
FIG. 16 depicts a representation of twenty-eight cells in a cellular system that have a frequency reuse pattern of 7 using two wireless trunks per 7-cell cluster.

In FIGS. 11, 12 and 13, a 4-cell repeat pattern is shown and in FIGS. 14, 15 and 16, a 7-cell repeat pattern is shown. For repeat patterns of 4 and 7 and as described in connection with FIG. 9, K=4 and K=7. For K=4, the frequency reuse distance D as described in connection with FIG. 9 is 3.46 R and for K=7, D is 4.6 R. Generally, radio propagation suffers from multi-path fading due to omni-coverage of cellular systems. The path-loss based on the frequency reuse distance is −2.16 dB for K=4 and −26.5 dB for K=7 if the constant α is chosen to be 4.

In FIG. 11, a second (trunk) wireless interface exists between the BSC in cell D1 and the BTS in cell A1. Non-interference of this trunk interface with other wireless interfaces can be achieved in a number of ways. For example, if cell A1 uses the frequencies $\omega_1(t)$ and $\omega_2(t)$, if cell B1 uses the frequencies $\omega_3(t)$ and $\omega_4(t)$, if cell C1 uses the frequencies $\omega_5(t)$ and $\omega_6(t)$, and if cell D1 uses the frequencies $\omega_6(t)$ and $\omega_7(t)$ for the first wireless interface, then the second wireless interface between base station controller 7-4 and the base station 7-1 uses, for example, the frequencies $\omega_9(t)$ and $\omega_{10}(t)$.

In FIG. 12, a second wireless (trunk) interface exists between the BSC in cell A2 and the BTS's in cells D1, C1, B2, D2, B4, and C3. Non-interference of this trunk wireless interface with other wireless interfaces can be achieved in a number of ways. For example, if cell D1 uses the frequency $\omega_1(t)$, if cell C1 uses the frequency $\omega_2(t)$, if cell B2 uses the frequency $\omega_3(t)$, if cell D2 uses the frequency $\omega_4(t)$, if cell B4 uses the frequency $\omega_5(t)$ and if cell C3 uses the frequency $\omega_6(t)$ as the first wireless interface, then the second wireless interface between base station controller BSC and the base stations BS use, for example, the frequencies $\omega_7(t)$, $\omega_8(t)$, $\omega_9(t)$, $\omega_{10}(t)$, $\omega_{11}(t)$ and $\omega_{12}(t)$.

In FIG. 13, a second wireless interface exists between the BSC in cell A2 and the BTS's in cells A1, B1 and B3. Non-interference of this trunk wireless interface with other wireless interfaces can be achieved in a number of ways. For example, if cell A1 uses the mobile station frequencies $\omega_1(t)$ and $\omega_2(t)$, if cell B1 uses the mobile station frequencies $\omega_3(t)$ and $\omega_4(t)$, if cell B3 uses the mobile station frequencies $\omega_5(t)$ and $\omega_6(t)$, and if cell D1 uses the mobile station frequencies $\omega_6 t$) and $\omega_7(t)$ as the first wireless interface, then the wireless trunk between base station controller 8 in cell A2 and the base station 7-1 uses, for example, the frequencies $\omega_9(t)$ and $\omega_{10}(t)$ as part of the second wireless interface. The wireless trunk between base station controller 8 in cell A2 and the base station 7-1 uses, for example, the frequencies $\omega_{11}(t)$ and $\omega_{12}(t)$. The wireless trunk between base station controller 8 in cell A2 and the base station 7-3 uses, for example, the frequencies $\omega_{13}(t)$ and $\omega_{14}(t)$ as part of the second wireless interface.

In FIG. 14, a cluster of seven cells is shown where trunk wireless interfaces exist between the BSC in cell G and the BTS's in the seven cells A, B, C, D, E and F. For the cluster of cells A, B, C, D, E, F, and G, cell A is contiguous to cell B, cell B is contiguous to cell C, cell C is contiguous to cell D, cell D is contiguous to cell E, cell E is contiguous to cell F, cell F is contiguous to cell A and cell G is contiguous to cells A, B, C, D, E and F. Non-interference of these trunk wireless interfaces with other wireless interfaces can be achieved in a number of ways. For example, if cell A uses the mobile station frequency $\omega_1(t)$, if cell B uses the mobile station frequency $\omega_2(t)$, if cell C uses the mobile station frequency $\omega_3(t)$, and if cell D uses the mobile station frequency $\omega_4(t)$, if cell E uses the mobile station frequency $\omega_5(t)$ and if cell F uses the mobile station frequency $\omega_6(t)$, then the wireless trunks between base station controller BSC and the base stations BS use, for example, the frequencies $\omega_7(t)$, $\omega_8(t)$, $\omega_9(t)$, $\omega_{10}(t)$, $\omega_{11}(t)$ and $\omega_{12}(t)$.

In FIG. 15, a trunk wireless interface exists between the BSC in cell D and the BTS's in cells G and E. Non-interference of this tn wireless interface with other wireless interfaces can be achieved in a number of ways. For example, if cell A uses the mobile station frequencies $\omega_1(t)$ and $\omega_2(t)$, if cell D uses the mobile station frequencies $\omega_3(t)$ and $\omega_4(t)$, if cell E uses the mobile station frequencies $\omega_5(t)$ and $\omega_6(t)$, and if cell G uses the mobile station frequencies $\omega_6(t)$ and $\omega_7(t)$ as part of the first wireless interface, then the wireless trunk between base station controller BSC in cell D and the BTS in cell G uses as part of the second wireless interface, for example, the frequencies $\omega_1(t)$ and $\omega_2(t)$ [that is, the same mobile station frequencies as used for cell A], the wireless trunk between base station controller BSC in cell D and the base station BS in cell E uses, for example, the frequencies $\omega_8(t)$ and $\omega_9(t)$ as part of the second wireless interface which can also be used, for example, for mobile station frequencies in cell B as part of the first wireless interface. Note that in FIG. 15, some of the in-band channels

[for example, $\omega_1(t)$ and $\omega_2(t)$] used in the first (mobile station) wireless interface are also used in the second (trunk) wireless interface.

In FIG. 16, the 7-cell repeat pattern of FIG. 16 is repeated to form a 28 cell cluster where each 7-cell pattern in FIG. 16 has the same frequency assignments as in FIG. 15. The details of the wireless interface for a 7-cell pattern are described for one-cell link and for two-cell link embodiments.

One-Cell Link. Referring to FIG. 15, station (first) wireless interfaces exist and trunk (second) wireless interfaces. In order not to have interference between these first and second wireless interfaces, the transmitted power, the antenna, the deployment and the frequency reuse pattern are selected so as to be non-interfering. For example, for a 7-cell repeat pattern as shown in FIG. 15, to connect cell D and cell G, a trunk (second) wireless interface uses the same carrier frequency as used in cell A in the mobile station wireless interface. The transmitted signal from the BSC in cell D for the DIG trunk interface must be attenuated to −26.5 dB when that signal reaches the base station BS (normally at the center of cell A). This condition is equivalent to a −4.9 dB signal level at the boundary of cell D and cell G. A directional antenna is used for the wireless trunk connection and the signal is attenuated to −10.9 dB at the center of cell G assuming a line of sight propagation condition for such a directional antenna. Based on this assumption, the in-band wireless trunk connection for a one-cell link between cells D and G is setup as follows:

(a) Adjust the power level to be −4.9 dB at the boundary of cell D and G (this signal will be attenuated to −26.5 dB at the center of cell A). Since the connection point is set at the center of cell G, the signal level at that point will be attenuated down to −10.9 dB for line of sight propagation;

(b) Use a directional antenna to compensate for the path-loss. For example, a 16 dB gain (which is 13 dB higher than the mobile station and which is enough to compensate for the −10.9 dB path-loss) dish antenna (0.9 m diameter at 900 MHz) receives this signal successfully at the center of cell G; and (c) For the directional antenna, the 3 dB beamwidth is approximately 23° which is smaller than the hexagonal spanning angle (60°) at that boundary. The side lobes are typically −25 dB or lower compared with the main lobe. This directional antenna configuration avoids interference of other channels with the same frequency used in other cells and other wireless interfaces.

Therefore, as indicated in connection with FIG. 15, the mobile station carrier frequency in cell A as part of the first wireless interface is also used as the wireless trunk connection frequency between cell D and cell G as part of the second wireless interface. In accord with the present invention, a wireless trunk connection is implemented with in-band carrier frequencies without deteriorating the system performance.

Two-Cell Link. Referring to FIG. 15, a two-cell trunk wireless interface link is implemented with the following kinds of connections:

(1) Oblique two-cell link with a wireless connection between cell D and F.

(2) Straight two-cell link with a wireless connection between cell D and G.

The first case having an oblique two-cell link is implemented based on the same configuration as in the one-ce link case, the mobile station carrier frequency in cell B or C is used to link the cell D and F depending on the network planning and radio propagation environment. However, the link between cell A and D is achieved using a highly directional antenna or using a spare carrier frequency if one is available.

In summary, the present invention implements in-band wireless trunk connections in current cellular systems without consuming too much spectrum resource by proper network planning (cell site, radio environment, etc.) and antenna selection (transmitted power, directivity, gain, etc.).

Figure 17:
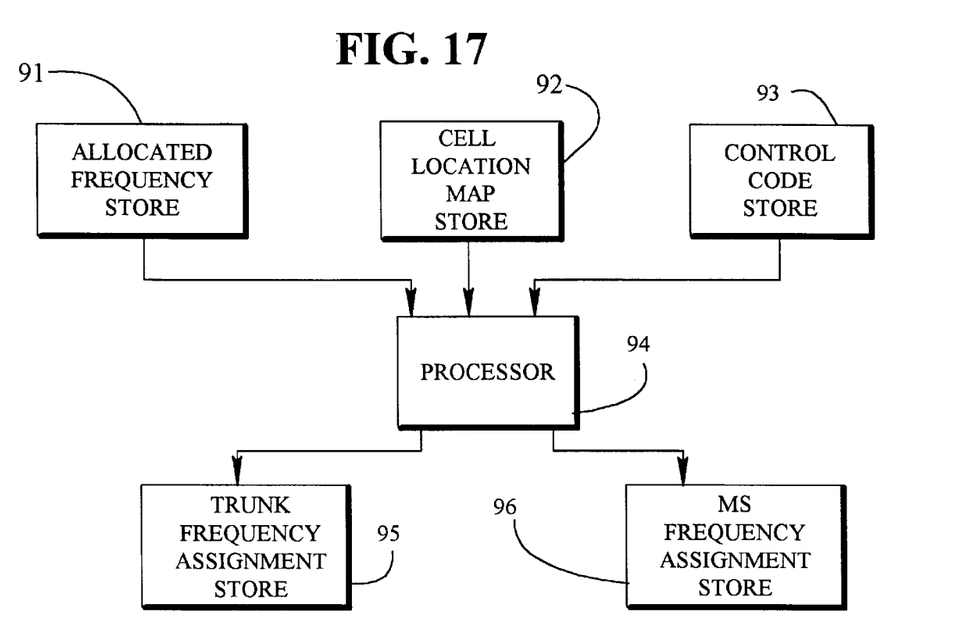
FIG. 17 depicts a block diagram of the frequency assignment apparatus for making mobile station and trunk frequency assignments.

Frequency Assignment—FIG. 17

In FIG. 17, the frequency assignment apparatus is shown for making mobile station and trunk frequency assignments according to the present invention. The frequency assignment apparatus of FIG. 17 is part of the mobile services switching center 5 and/or the base station subsystems 12 of FIG. 1. The allocated frequency store 91 stores identifiers for all of the carrier frequencies licensed to a particular operator of a cellular system. The cell location map store 92 stores a representation of the cluster type indicating the cell repeat pattern and hence stores the location of cells. The control code store 93 stores the network management code used to manage the frequency resources based on the cluster type from cell location map store 92 and the operating frequencies from allocated frequency store 91. The processor 94 is a general purpose or special processor for executing the control code from store 93 to make frequency assignments based upon the cell location map from store 92 and the available frequencies from the store 91. The trunk frequency assignment store 95 stores the assigned trunk frequency for each wireless link between a BTS and a BSC. The MS frequency assignment store 96 stores the assigned MS frequencies used in each cell.

While the invention has been particularly shown and described with reference to preferred embodiments thereof it will be understood by those skilled in the art that various changes in form and details may be made therein without departing from the spirit and scope of the invention.

What is claimed is:

1. A communication system having a plurality of wireless in-band channels including forward channels and reverse channels, said system comprising:

base station means including,
    base unit means including a first transceiver means operating with a first wireless interface formed of first ones of said in-band channels for broadcasting said forward channel communications and for receiving said reverse channel communications, said base unit means including a second transceiver means for transmitting and receiving forward and reverse channel communications over a second wireless interface;
base station controller means including a third transceiver means for transmitting said forward channel communications and for receiving said reverse channel communications over said second wireless interface, said base station controller means including,
    controller base unit means operating to transfer forward channel communications and reverse channel communications between a third interface and a fourth interface, and
    controller trunk unit means including said third transceiver means operating with said second wireless interface formed of second one of said in-band channels for transmitting said forward channel communications and for receiving said reverse channel communications;

wherein said controller base unit means connects the channel communications to and from the controller trunk unit means, wherein said controller trunk unit means connects the channel communications to and from said controller base unit means; and a plurality of mobile stations, each of said mobile stations including mobile station transceiver means for receiving said forward channel communications and for broadcasting said reverse channel communications over said first wireless interface.

2. The system of claim 1 wherein said first wireless interface and said second wireless interface have one or more common in-band channels.

3. The system of claim 1 wherein said base station controller means includes a directional antenna for transmitting said forward channel communications over said second wireless interface and wherein said base unit means includes a directional antenna for transmitting said reverse channel communications over said second wireless interface.

4. The system of claim 1 wherein said controller base unit means and said controller trunk unit means operate together to transfer channel communications between the controller base unit means and the controller trunk unit means with an Abis interface.

5. The system of claim 1 wherein said base unit means includes a transmitter/receiver unit for said first wireless interface, a processor unit, and an E1 interface unit for the Abis interface.

6. The system of claim 1 wherein said controller trunk unit means includes a transmitter/receiver unit for said second wireless interface, a processor unit, and an E1 interface unit for an Abis interface.

7. The system of claim 1 wherein said third interface is an A interface and said fourth interface is an Abis interface and wherein said base unit means includes a base unit trunk unit means including said second transceiver means operating with said second wireless interface.

8. The system of claim 7 wherein said controller base unit means and said controller trunk unit means operate together to transfer channel communications between the controller base unit means and the controller trunk unit means with an Abis interface.

9. The system of claim 7 wherein said controller base unit means includes an A unit for A interface transfers, a codec unit for coding and decoding, a processor unit, and an E1 interface unit for the Abis interface.

10. The system of claim 7 wherein said controller trunk unit means includes a transfer/receiver unit for said second wireless interface, a processor unit, and an E1 interface unit for the Abis interface.

11. The system of claim 7 further including a mobiles services switching center for communicating with said base station controller means over said A interface and for connection to a public switched telephone network.

12. A cellular communication system having a plurality of cells and having a plurality of wireless in-band channels including forward channels and reverse channels, said system comprising:

for each cell, base station means including, base unit means including a first transceiver means operating with a first wireless interface formed of first ones of said in-band channels for broadcasting said forward channel communications and for receiving said reverse channel communications, said base unit means including a second transceiver means for transmitting and receiving forward and reverse channel communications over a second wireless interface;

for each cell, base station controller means including a third transceiver means for transmitting said forward channel communications and for receiving said reverse channel communications over said second wireless interface, said base station controller means including, controller base unit means operating to transfer forward channel communications and reverse channel communications between a third interface and a fourth interface;

controller trunk unit means including said third transceiver means operating with said second wireless interface formed of second ones of said in-band channels for transmitting said forward channel communications and for receiving said reverse channel communications;

wherein said controller base unit means connects the channel communications to and from the controller trunk unit means and wherein said controller trunk unit means connects the channel communications to and from said controller base unit means; and for each cell, a plurality of mobile stations, each of said mobile stations including mobile station transceiver means for receiving said forward channel communications and for broadcasting said reverse channel communications over said first wireless interface.

13. The system of claim 12 wherein said first wireless interface and said second wireless interface have one or more common in-band channels.

14. The system of claim 12 wherein said base station controller means includes a directional antenna for transmitting said forward channel communications over said second wireless interface and wherein said base unit means includes a directional antenna for transmitting said reverse channel communications over said second wireless interface.

15. The system of claim 12 wherein said controller base unit means and said controller trunk unit means operate together to transfer channel communications between the controller base unit means and the controller trunk unit means with an Abis interface.

16. The system of claim 12 wherein said base unit means includes a transmitter/receiver unit for said first wireless interface, a processor unit, and an E1 interface unit for the Abis interface.

17. The system of claim 12 wherein said controller trunk unit means includes a transmitter/receiver unit for said second wireless interface, a processor unit, and an E1 interface unit for an Abis interface.

18. The system of claim 12 wherein said third interface is an A interface and said fourth interface is an Abis interface and wherein said base unit means includes a base unit trunk unit means including said second transceiver means operating with said second wireless interface.

19. The system of claim 18 wherein said controller base unit means and said controller trunk unit means operate together to transfer channel communications between the controller base unit means and the controller trunk unit means with an Abis interface.

20. The system of claim 18 wherein said controller base unit means includes an A unit for A interface transfers, a codec unit for coding and decoding, a processor unit, and an E1 interface unit for the Abis interface.

21. The system of claim 18 wherein said controller trunk unit means includes a transmitter/receiver unit for said second wireless interface, a processor unit, and an E1 interface unit for the Abis interface.

22. The system of claim 18 further including a mobiles services switching center for communicating with said base station controller means in each of said cells over said A interface and for connection to a public switched telephone network.

23. The system of claim 18 wherein said cells are organized in repeated clusters, wherein channels forming said first interface are assigned for each cell in a cluster and wherein channels forming said second interface are assigned for one or more cells in each cluster.

24. The system of claim 23 wherein there are seven cells in each cluster.

25. The system of claim 23 wherein each cluster includes cells A, B, C, D, E, F, and G with A contiguous to B, with B contiguous to C, with C contiguous to D, with D contiguous to E, with E contiguous to F, with P contiguous to A and with G contiguous to A, B, C, D, E and F.

26. The system of claim 25 wherein one or more particular channels assigned to said first wireless interface for cell A are assigned to said second wireless interface between cell G and cell D.

* * * * *